United States Patent

Yasue et al.

[11] Patent Number: 5,827,153
[45] Date of Patent: Oct. 27, 1998

[54] APPARATUS FOR REDUCING PRESSURE OF FRICTIONAL COUPLING DEVICE OF VEHICLE AUTOMATIC TRANSMISSION UPON SHIFTING TO NON-DRIVE POSITION

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 883,899

[22] Filed: Jun. 27, 1997

[30] Foreign Application Priority Data

Jul. 3, 1996 [JP] Japan ................................. 8-173456

[51] Int. Cl.⁶ ............................. F16H 61/06; F16H 61/08
[52] U.S. Cl. ......................... 477/155; 475/128; 477/77; 477/119; 192/3.58
[58] Field of Search ............................. 477/77, 116, 117, 477/155, 180, 143, 150, 162; 192/3.3, 3.29, 3.58, 3.62; 475/127, 128

[56] References Cited

U.S. PATENT DOCUMENTS

| 4,457,411 | 7/1984 | Hiramatsu | 477/180 X |
| 4,724,727 | 2/1988 | Shibayama et al. | 477/117 X |
| 4,870,581 | 9/1989 | Ito et al. | 477/155 X |
| 5,072,390 | 12/1991 | Lentz et al. | 477/155 |
| 5,558,599 | 9/1996 | Tsukamoto et al. | 477/116 |

FOREIGN PATENT DOCUMENTS 4-236853   8/1992   Japan.

*Primary Examiner*—Rodney H. Bonck
*Assistant Examiner*—Sherry Lynn Estremsky
*Attorney, Agent, or Firm*—Oblon, Spivak, McClelland, Maier & Neustadt, P.C.

[57] ABSTRACT

An apparatus for controlling an automatic transmission of a motor vehicle which is shifted to a non-drive position with a releasing action of a hydraulically operated frictional coupling clutch upon operation of a manually operated member from a drive position to a non-drive position, the apparatus including a non-drive shift detecting device for detecting a non-drive shifting operation of the manually operated member from the drive position to the non-drive position, a rapid pressure reduction device operated upon detection of the non-drive shifting operation for rapidly reducing a pressure of the hydraulically operated frictional coupling device to a predetermined pressure level, and a continuous pressure reduction device for continuously reducing the pressure of the frictional coupling device from the predetermined pressure level at a predetermined reduction rate.

7 Claims, 10 Drawing Sheets

FIG. 2

| SHIFT LEVER | TRANSMISSION POSITIONS | $C_1$ | $C_2$ | $C_3$ | $B_1$ | $B_2$ | $B_3$ | $F_1$ | $F_2$ |
|---|---|---|---|---|---|---|---|---|---|
| P |  |  |  |  |  |  | ○ |  |  |
| R |  |  | ○ |  |  | ○ | ○ |  |  |
| N |  |  |  |  |  |  | ○ |  |  |
| D | 1st | ○ |  |  |  |  | ○ | △ | △ |
| D | 2nd | ○ |  | ○ |  |  | ○ |  | △ |
| D | 3rd | ○ | ○ |  |  |  | ○ |  | △ |
| D | 4th | ○ | ○ | ○ |  |  |  |  |  |
| 2 | 1st | ○ |  |  |  |  | ○ | △ | △ |
| 2 | 2nd | ○ |  | ○ |  |  | ○ |  | △ |
| L | 1st | ○ |  |  |  | ○ | ○ | △ | △ |

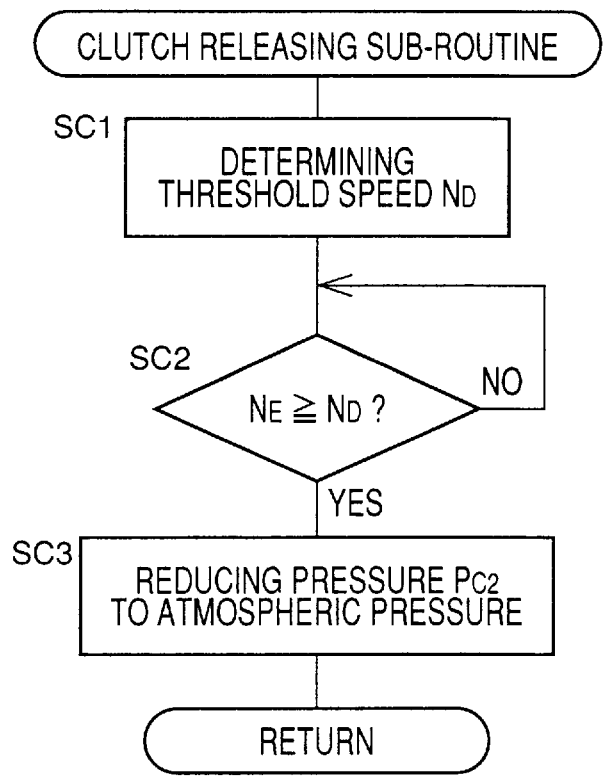

APPARATUS FOR REDUCING PRESSURE OF FRICTIONAL COUPLING DEVICE OF VEHICLE AUTOMATIC TRANSMISSION UPON SHIFTING TO NON-DRIVE POSITION

BACKGROUND OF THE INVENTION

1. Field of the Invention

The present invention relates in general to an apparatus for controlling an automatic transmission of a motor vehicle, and more particularly to techniques for reducing a shifting shock of the automatic transmission upon operation of shift lever to non-drive position.

2. Discussion of the Related Art

For controlling an automatic transmission of a motor vehicle, there is known a control apparatus adapted to control a hydraulically operated frictional coupling clutch which is engaged or released to shift the automatic transmission to a non-drive position upon operation of a shift lever from a drive position to a non-drive position, such that the line pressure in a hydraulic control device for controlling the frictional coupling clutch is changed if the amount of deviation of the idling speed of a vehicle engine from a desired or target value exceeds a predetermined threshold, so that the timing of the engaging or releasing action of the frictional coupling clutch with respect to the initiation of control of the engine idling speed is adjusted so as to prevent a temporary excessive drop or rise of the engine speed due to the inadequate timing. JP-A-4-236853 discloses an example of such a transmission control apparatus, which is capable of effectively preventing such an excessive drop or rise of the engine speed, irrespective of a variation in the time duration of the engaging or releasing action of the frictional coupling device due to a chronological change of the friction characteristic of the frictional coupling device and a change in the temperature of the working fluid.

However, the known control apparatus described above suffers from a drawback that a shifting shock is generated upon operation of the shift lever from a drive position to a non-drive position while the vehicle is stopped. This shock is generated due to releasing of the frictional coupling device to shift the automatic transmission to the non-drive position, and resulting disconnection of a power transmission path in the automatic transmission, which causes abrupt consumption of an elastic energy which has been generated and accumulated by torsional deformation of components in the vehicle drive system. This drawback is serious particularly where the hydraulically operated frictional coupling device in question is not provided with an accumulator, and the pressure of the frictional coupling device is directly controlled by a pressure regulating valve.

SUMMARY OF THE INVENTION

It is therefore an object of this invention to provide an apparatus for controlling an automatic transmission of a motor vehicle having a hydraulically operated frictional coupling device which is released upon operation of a shift lever from a drive position to a non-drive position, which apparatus is provided with means for reducing a shock upon shifting of the automatic transmission to a non-drive position in response to the operation of the shift lever to the non-drive position.

The above object may be achieved according to the principle of the present invention, which provides an apparatus for controlling an automatic transmission of a motor vehicle which is shifted to a non-drive position with a releasing action of a hydraulically operated frictional coupling clutch upon operation of a manually operated member from a drive position to a non-drive position, the apparatus comprising: (a) non-drive shift detecting means for detecting a non-drive shifting operation of the manually operated member from the drive position to the non-drive position; (b) rapid pressure reduction means, operated upon detection of the non-drive shifting operation by the non-drive shift detecting means, for rapidly reducing a pressure of the hydraulically operated frictional coupling device to a predetermined pressure level; and (c) continuous pressure reduction means for continuously reducing the pressure of the frictional coupling device from the predetermined pressure level at a predetermined reduction rate.

In the apparatus of the present invention constructed as described above, the rapid pressure reduction means is operated, upon detection of the non-drive shifting operation operation of the manually operated member such as a shift lever from the drive position to the non-drive position, to rapidly reduce the pressure of the hydraulically operated frictional coupling device from the predetermined level $P_D$, and then the continuous pressure reduction means is operated to continuously reduce the pressure from the predetermined pressure level at the predetermined reduction rate, whereby the frictional coupling device is eventually released. Since the present apparatus permits the frictional coupling device to be released with relatively slow reduction of its pressure, an elastic energy which has been accumulated by torsional deformation of the various components of the vehicle drive system is relatively slowly consumed as the frictional coupling device is slowly released. Accordingly, the present control apparatus permits the automatic transmission to be shifted to the non-drive position with a reduced shifting shock, in response to the non-drive shifting operation of the manually operated member.

The pressure level to which the pressure of the frictional coupling device is rapidly reduced is preferably selected to be close to (i.e., slightly higher or lower than) a critical level at which the substantial releasing action of the frictional coupling device is initiated. More preferably, the pressure level is selected to be slightly higher than the critical level. The thus selected pressure level which determines the amount of rapid reduction of the pressure of the frictional coupling device makes it possible to release the frictional coupling device in a relatively short time, and assures a relatively high response of the automatic transmission to the operation of the manually operated member to the non-drive position, for instance, from the rear-drive position to the neutral position.

In one preferred form of this invention, the apparatus further comprises pressure level learning compensation means for updating, by learning compensation, the predetermined pressure level such that the releasing action of the frictional coupling device takes place in a predetermined manner. This learning compensation of the pressure level to which the pressure of the frictional coupling device is rapidly reduced upon operation of the manually operated member to the non-drive position permits the frictional coupling device to be released in the desired manner to shift the automatic transmission to the non-drive position without a considerable shifting shock, irrespective of a change in the temperature of the working fluid of the frictional coupling device and a chronological change of the operating characteristic of the frictional coupling device.

According to one advantageous arrangement of the above preferred form of the invention, the pressure level compensation means updates the predetermined pressure level such that a time duration between a moment of detection of the non-drive shifting operation of the manually operated member by the non-drive shift detecting means and a moment of initiation of the releasing action of the frictional coupling device coincides with a predetermined target time. In the next occurrence of the non-drive shifting operation of the manually operated member, the pressure of the frictional coupling device is rapidly reduced to the thus updated pressure level.

In a second preferred form of the invention, the apparatus further comprises clutch release detecting means for detecting substantial full releasing of the frictional coupling device, and fully releasing means, operated upon detection of the substantially full releasing of the frictional coupling device by the clutch release detecting means, for reducing the pressure of the frictional coupling device to an atmospheric pressure. This reduction of the pressure of the frictional coupling device to the atmospheric pressure after the detection of the substantially full releasing of the frictional coupling device is effective to avoid abrupt consumption of the residual elastic energy of the vehicle drive system due to earlier exposure of the frictional coupling device to the atmospheric pressure.

According to one advantageous arrangement of the above second preferred form of the invention, the apparatus further comprises idling speed control means for controlling a speed of an engine of the motor vehicle, in response to the non-drive shifting operation of the manually operated member, such that the speed of the engine coincides with a predetermined target value, and threshold determining means for determining, on the basis of the predetermined target value of the speed of the engine, a threshold which is used by the clutch release detecting means to determine whether the frictional coupling device has been substantially fully released. This arrangement assures improved accuracy of detection of the substantial full releasing of the frictional coupling device by the clutch release detecting means.

Preferably, the threshold determining means is adapted to determine, as the threshold, a threshold value of a time which has passed after a moment of initiation of the releasing action of the frictional coupling device. The threshold determining means determines the threshold value on the basis of the predetermined target value of the speed of the engine. In this case, the clutch release detecting means detects the substantially full releasing of the frictional coupling device when the time has reached the threshold value.

Alternatively, the threshold determining means may be adapted to determine, as the threshold, a threshold value of the speed of the engine on the basis of the predetermined target value of the speed of the engine. In this case, the clutch release detecting means detects the substantially full releasing of the frictional coupling device when the speed of the engine has increased to the threshold value.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 2 is a view indicating combinations of operating states of clutches and brakes for establishing respective operating positions of the automatic transmission of FIG. 1;

FIG. 10 is a flow chart corresponding to that of FIG. 7, showing another embodiment of this invention.

DETAILED DESCRIPTION OF THE PREFERRED EMBODIMENTS

Figure 1:
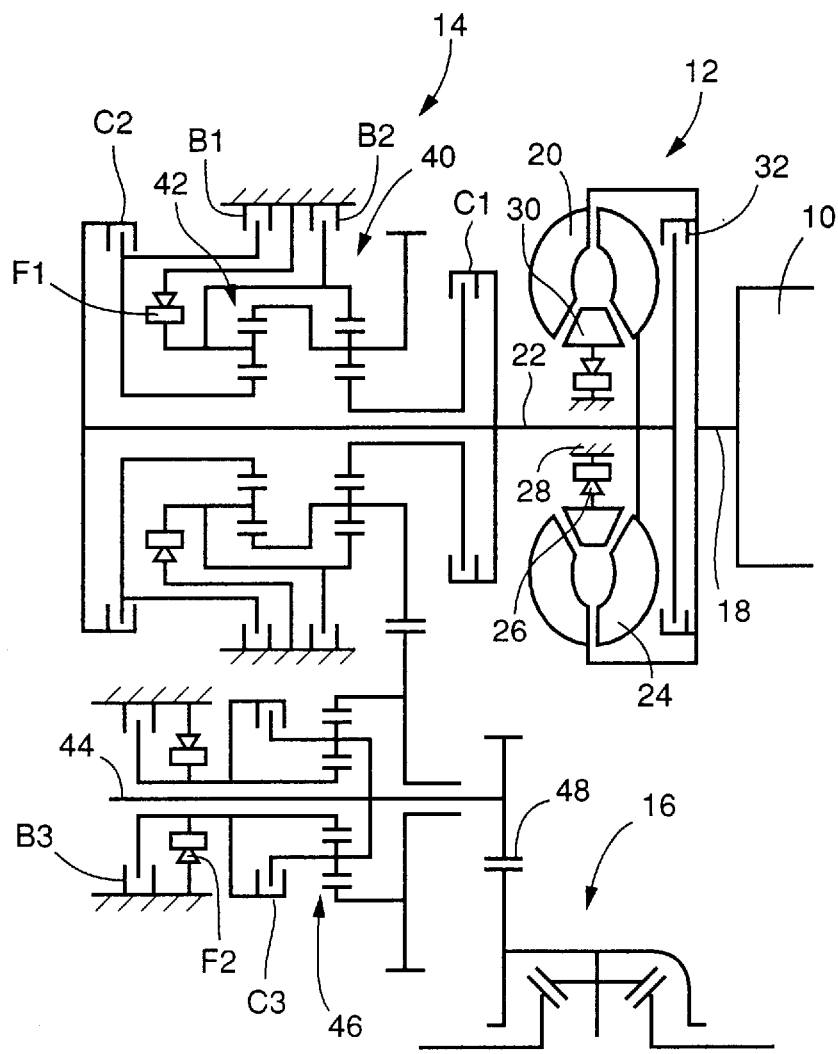
FIG. 1 is a schematic view showing a power transmitting system of a motor vehicle including an automatic transmission to which the present invention is applicable.

Referring first to FIG. 1, there is shown a power transmitting system of a motor vehicle, wherein an output of an engine 10 is transmitted to drive wheels of the vehicle through a fluid-operated power transmitting device in the form of a torque converter 12, an automatic transmission 14, and a differential gear device 16. The torque converter 12 includes a pump impeller 20 connected to a crankshaft 18 of the engine 10, a turbine impeller 24 connected to an input shaft 22 of the automatic transmission 14, a stator impeller 30 fixed through a one-way clutch 26 to a stationary member in the form of a housing 28, and a lock-up clutch 32 connected through a suitable damper to the input shaft 22.

The automatic transmission 14 includes: two single-pinion type planetary gear sets 40, 42 disposed coaxially with the input shaft 22; a planetary gear set 46 disposed coaxially with a counter shaft 44 which is parallel to the input shaft 22; and an output gear 48 which is fixed to an end of the counter shaft 44 and which meshes with the differential gear device 16. Elements of the planetary gear sets 40, 42, 46 are selectively connected to each other by selective engagement of three clutches C1, C2, C3, and are selectively fixedly connected to the housing 28 by selective engagement of three brakes B1, B2, B3. Further, the elements of the planetary gear sets 40, 42, 46 are selectively connected to each other or fixedly connected to the housing 28, through two one-way clutches F1, F2, depending upon the directions of rotation of those elements. Since the differential gear device 16 is symmetrical with respect to its axis (drive axle of the vehicle), only a half (an upper half) of the device 16 is shown in FIG. 1.

The clutches C1, C2, C3 and brakes B1, B2, B3 (which will be generally referred to as "clutches C and brakes B", where appropriate) are hydraulically operated frictional coupling devices such as multiple-disc clutches and band-brakes, which are engaged by suitable hydraulic actuators.

The automatic transmission 14 has four forward-drive positions "1st", "2nd", "3rd" and "4th", as indicated in FIG. 2. With the clutches C and brakes B selectively engaged by the respective hydraulic actuators, a selected one of the four forward-drive positions of the automatic transmission 14 is established. In FIG. 2, "○" represents engaged states of the clutches C and brakes B, and "Δ" represent engaged states of the one-way clutches F1, F2 only when a drive torque is transmitted in the forward direction from the engine 10 toward the drive wheel. The one-way clutches F1, F2 are not engaged when the appropriate operating positions of the automatic transmission 14 are established with an engine brake being applied to the vehicle. It will also be noted that the absence of the symbols "○" and "Δ" indicates released states of the clutches C, brakes B and one-way clutches F1, F2.

Figure 3:
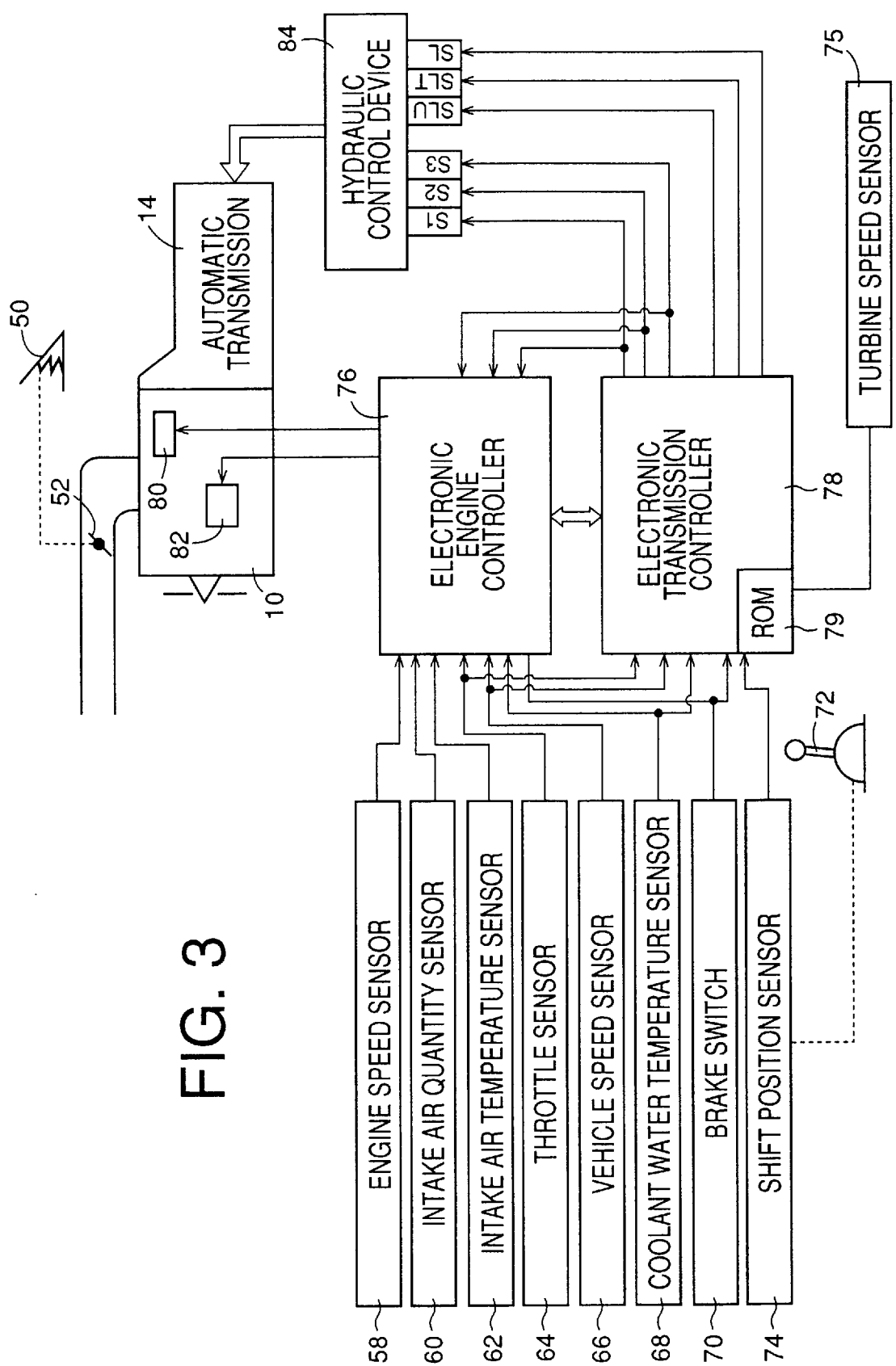
FIG. 3 is a block diagram illustrating a control system for the vehicle, including a control apparatus in the form of an electronic transmission controller constructed according to one embodiment of this invention for controlling the automatic transmission of FIG. 1.

The engine 10 and the automatic transmission 14 are controlled by a control system shown in FIG. 3, wherein a throttle valve 52 is disposed in an intake pipe of the engine 10. The throttle valve 52 is operatively linked with an accelerator pedal 50. The control system includes an electronic engine controller 76 and an electronic transmission controller 78 which are connected to each other. The engine controller 76 is adapted to receive output signals of an engine speed sensor 58, an intake air quantity sensor 60, an intake air temperature sensor 62, a throttle sensor 64, a vehicle speed sensor 66, a coolant water temperature sensor 68 and a BRAKE switch 70, while the transmission controller 78 is adapted to receive the output signals of the sensors 64, 66, 68 and BRAKE switch 70, and an output signal of a shift position sensor 74. The output signal of the engine speed sensor 58 represents a speed $N_E$ of the engine 10. The output signal of the intake air quantity sensor 60 represents an intake air quantity Q of the engine 10. The output signal of the intake air temperature sensor 62 represents a temperature $T_A$ of the intake air of the engine 10. The output signal of the throttle valve 52 represents an opening angle θ of the throttle valve 52. The output signal of the vehicle speed sensor 66 represents a rotating speed $N_{OUT}$ of the counter shaft 44, which can be used to calculate a running speed V of the motor vehicle. The output signal of the coolant water temperature sensor 68 represents a temperature $T_W$ of a coolant water of the engine 10. The output signal of the BRAKE switch 70 indicates an operating state of a brake pedal (not shown). The output signal of the shift position sensor 74 represents a currently selected or established position $P_{sh}$ of a manually operated member in the form of a shift lever 72. The transmission controller 78 also receives an output signal of a turbine speed sensor 75 representative of a rotating speed $N_T$ of the turbine impeller 24, that is, a rotating speed $N_{IN}$ of the input shaft 22 of the automatic transmission 14. The speed $N_{IN}$ will be referred to as "input speed of the automatic transmission 14" where appropriate.

As indicated in FIG. 2, the shift lever 72 has a PARKING position "P", a REAR-DRIVE position "R", a NEUTRAL position "N", a FORWARD-DRIVE position "D", a SECOND position "2" and a LOW position "L". The positions "P" and "N" are referred to as "non-drive positions", while the positions "R", "D", "2" and "L" are referred to as "drive positions". When the shift lever 72 is operated to the non-drive position "P" or "N", the automatic transmission 14 is shifted to a non-drive position. When the shift lever 72 is placed in the REAR-DRIVE position "R", the automatic transmission 14 is placed in a rear-drive position for driving the vehicle in the rearward direction. When the shift lever 72 is placed in any one of the drive positions "D", "2", "L", the automatic transmission is placed in one of the four forward-drive positions "1st", "2nd", "3rd" and "4th" for driving the vehicle in the forward direction.

The engine controller 76 is a so-called microcomputer incorporating a central processing unit (CPU), a random-access memory (RAM), a read-only memory (ROM), and an input and output interface. The CPU of the engine controller 76 operates according to control programs stored in the ROM while utilizing a temporary data storage function of the RAM, to process the received output signals of the sensors indicated above, for effecting various control operations to control the engine 10, such as an operation to control a fuel injector valve 80 for controlling an amount of injection of a fuel, an operation to control an ignitor 82 for controlling the ignition timing of the engine 10, and an operation to control a well known by-pass valve for controlling an idling speed of the engine 10.

The transmission controller 78 is also a microcomputer similar to that of the engine controller 76. A CPU of the microcomputer of the transmission controller 78 is also adapted to operate according to control programs stored in a ROM 79 while utilizing a temporary data storage function of a RAM, to process the received output signals of the sensors, for controlling various solenoid-operated valves S1, S2, S3, SL and linear solenoid valves SLU, SLT used in a hydraulic control device 84 for the automatic transmission 14. For instance, the transmission controller 78 controls the linear solenoid valve SLT so as to generate an output pressure $P_{SLT}$ corresponding to the opening angle θ of the throttle valve 52, controls the linear solenoid valve SLU so as to control an amount of slip $N_{SLIP}$ of the lock-up clutch 32, and controls the solenoid-operated valve SL for selectively engaging and releasing the lock-up clutch 32. The transmission controller 78 is further adapted to determine whether the automatic transmission 14 should be shifted up or down from the currently established position to another position, on the basis of the detected opening angle θ of the throttle valve 52 and running speed V of the vehicle, and according to predetermined shift patterns, and whether the lock-up clutch 32 should be engaged or released. According to results of these determinations, the transmission controller 78 controls the solenoid-operated valves S1, S2, S3 so as to shift the automatic transmission 14 and controls the operating state of the lock-up clutch 24.

Figure 4:
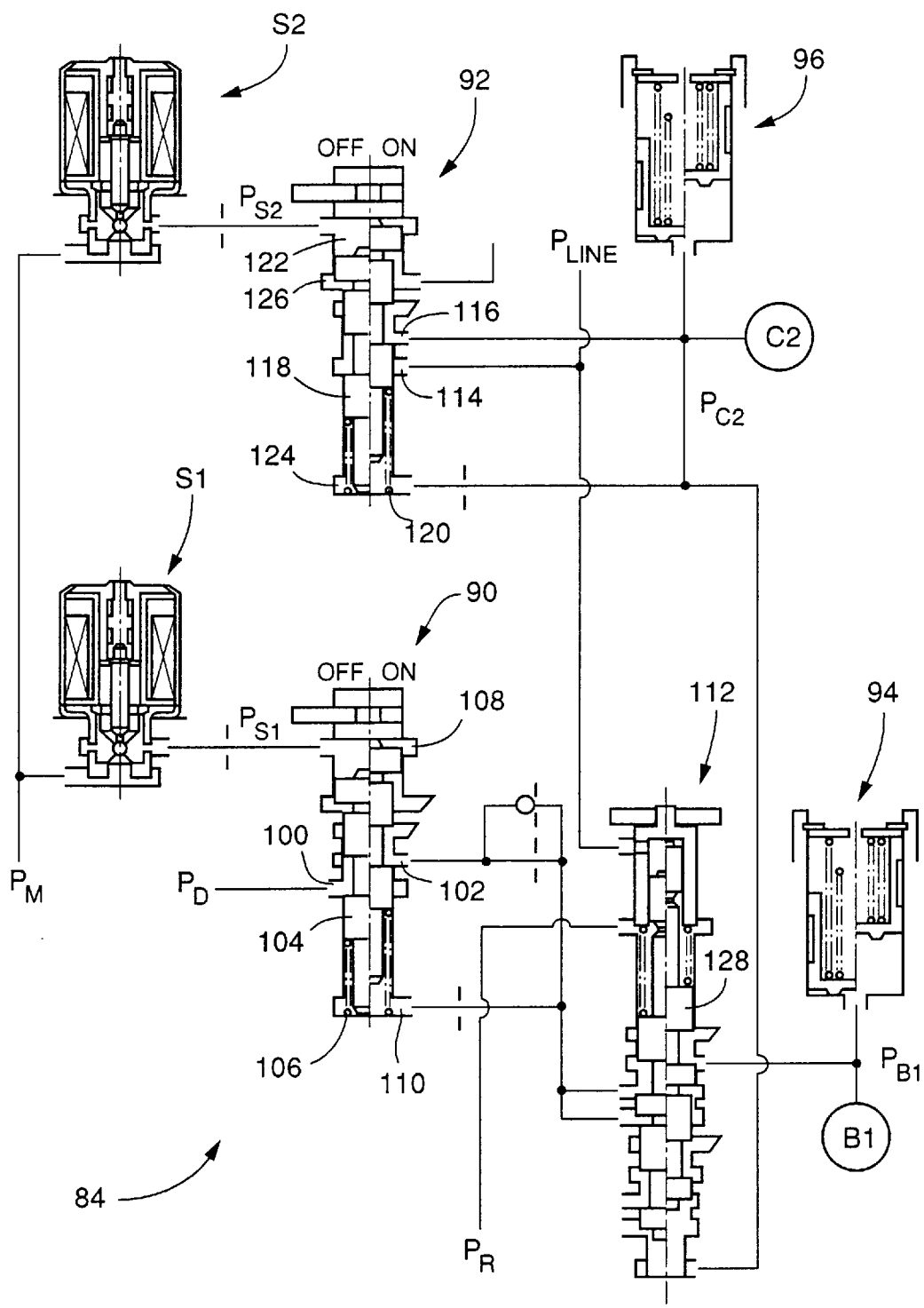
FIG. 4 is a view showing a part of a hydraulic control device for the automatic transmission, which device is shown in FIG. 3.

Referring to FIG. 4, there are shown components of the hydraulic control device 84, which control the engaging and releasing actions of the brake B1 and clutch C2 used to establish the second-speed and third-speed positions "2nd" and "3rd" of the automatic transmission 14. In the hydraulic control device 84, the solenoid-operated valves S1 and S2 receive a MODULATOR PRESSURE $P_M$ which is obtained by regulating a line pressure $P_{LINE}$. These solenoid-operated valves S1, S2 are controlled according to drive signals received from the transmission controller 78. The drive signals indicate duty ratios of the valves S1, S2, namely, drive currents $I_{S1}$ and $I_{S2}$ for energizing the solenoid coils of the valves S1, S2. The valves S1, S2 generate control pressures $P_{S1}$ and $P_{S2}$ corresponding to the amounts of the received drive currents $I_{S1}$, $I_{S2}$. The control pressures $P_{S1}$, $P_{S2}$ are applied to a B1 pressure regulating valve 90 and a C2 pressure regulating valve 92, respectively, so that pressures $P_{B1}$ and $P_{C1}$ are applied to the brake B1 and the clutch C2, respectively. To the brake B1 and clutch C2, there are connected a B1 damper 94 and a C2 damper 96, respectively, for absorbing pulsation of the pressures $P_{B1}$, $P_{C2}$.

The B1 pressure regulating valve 90 has: an input port 100 for receiving a FORWARD DRIVE pressure $P_D$ which is generated from a manual valve when the shift lever 72 is operated to one of forward-drive positions such as DRIVE position "D", THIRD position "3", SECOND position "2" and LOW position "L"; an output port 102 through which the pressure $P_{B1}$ is applied to the brake B1; a spool 104 for connecting and disconnecting the input and output ports 100, 102 to and from each other; a spring 106 for biasing the spool 104 in a valve-closing direction for disconnecting the input and output ports 100, 102; an oil chamber 108 adapted to receive the control pressure $P_{S1}$ which biases the spool 104 in a valve-opening direction for connecting the input and output ports 100, 102; and a feedback oil chamber 110 accommodating the spring 106 and adapted to receive the pressure $P_{B1}$ as a feedback pressure which biases the spool 104 in the valve-closing direction. The B1 pressure regulating valve 90 regulates the pressure $P_{B1}$ on the basis of the control pressure $P_{S1}$, according to the following equation (1):

$$P_{B1}=(S1 \cdot P_{S1}-W1)/S2 \qquad (1)$$

In the above equation (1), "S1" and "S2" represent a pressure-receiving area of the oil chamber 108 and a pressure-receiving area of the feedback oil chamber 110, while "W1" represents a biasing force of the spring 106. The pressure-receiving area S1 is larger than the pressure-receiving area S2.

The thus regulated pressure $P_{B1}$ is applied to the brake B1 through a fail-safe valve 112.

The C2 pressure regulating valve 92 has: an input port 114 adapted to receive the line pressure $P_{LINE}$; an output port 116 through which the pressure $P_{C2}$ is applied to the clutch C2; a spool 118 for connecting and disconnecting the input and output ports 114, 116 to and from each other; a spring 120 for biasing the spool 118 in a valve-closing direction for disconnecting the input and output ports 114, 116 from each other; an oil chamber 122 adapted to receive the control pressure $P_{S2}$ which biases the spool 118 in a valve-opening direction for connecting the input and output ports 114, 116; a feedback oil chamber 124 accommodating the spring 120 and adapted to receive the pressure $P_{C2}$ as a feedback pressure which biases the spool 118 in the valve-closing direction; and an oil chamber 126 adapted to receive a LOW POSITION pressure $P_L$ which is generated upon operation of the shift lever 72 to the LOW position "L" and which acts to hold the spool 118 in the closed position. The C2 pressure regulating valve 92 regulates the pressure $P_{C2}$ on the basis of the control pressure $P_{S2}$, according to the following equation (2):

$$P_{C2}=(S3 \cdot P_{S2}-W2)/S4 \qquad (2)$$

In the above equation (2), "S3" and "S4" represent a pressure-receiving area of the oil chamber 122 and a pressure-receiving area of the feedback oil chamber 124, while "W2" represents a biasing force of the spring 120. The pressure-receiving area S3 is larger than the pressure-receiving area S4.

The thus regulated pressure $P_{C2}$ is applied to the clutch C2.

The fail-safe valve 112 is provided to protect the brakes B1, B2 upon simultaneous generation of the pressure $P_{C2}$ for the clutch C2, the pressures $P_{B1}$ and $P_{B2}$ for the brakes B1, B2. In the event the pressure $P_{C2}$ is raised simultaneously with the pressure $P_{B1}$ or $P_{B2}$, a spool 128 of the fail-safe valve 112 is moved up as seen in FIG. 4, so as to cut the pressure $P_{B1}$ for the brake B1 or the pressure $P_{B2}$ for the brake B2.

Figure 5:
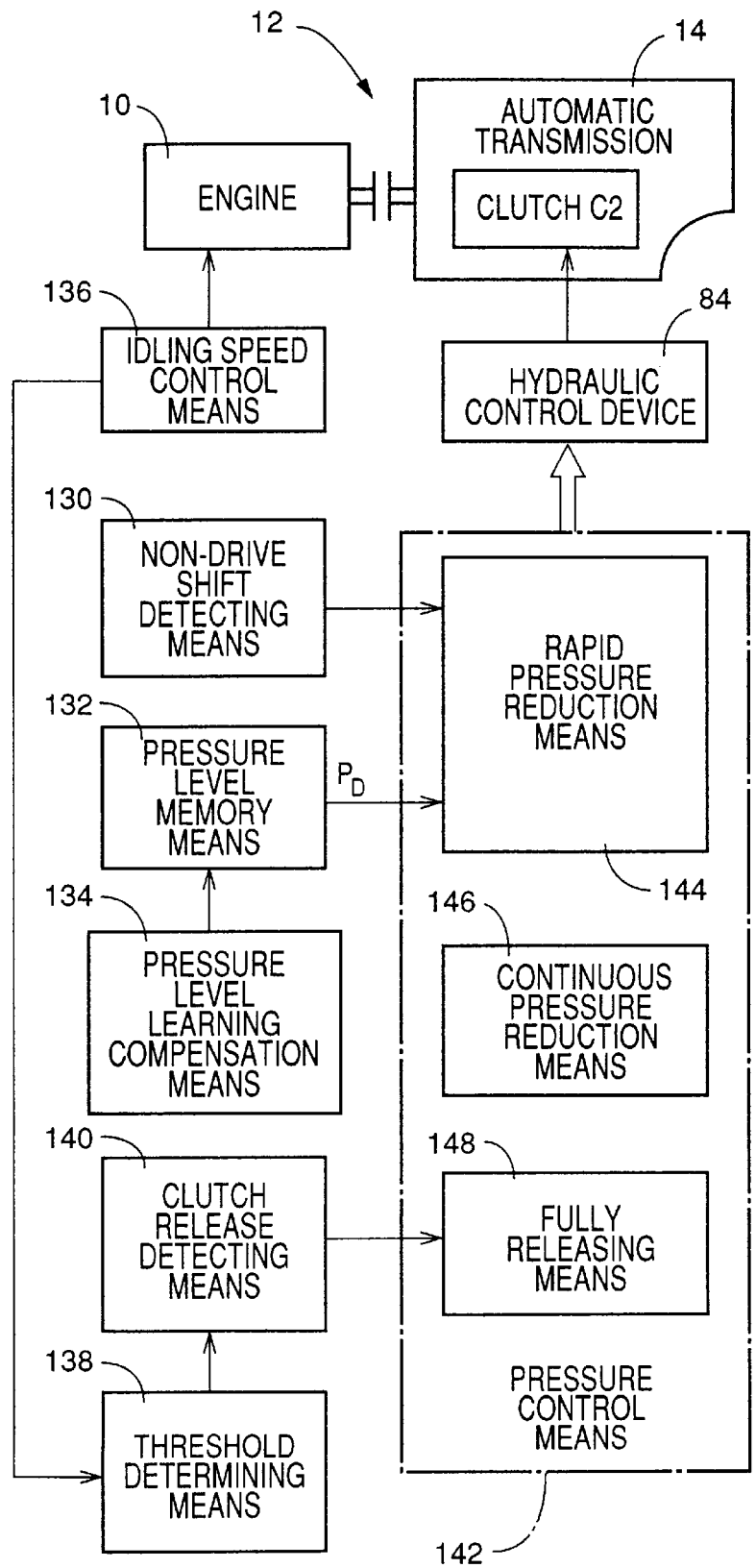
FIG. 5 is a block diagram illustrating various functional means of the transmission controller of FIG. 3.

Referring next to the block diagram of FIG. 5, there will be described the functions of the various functional means of the electronic transmission controller 78. This transmission controller 78 includes non-drive shift detecting means 130, pressure level memory means 132, pressure level learning compensation means 134, idling speed control means 136, threshold determining means 138, clutch release detecting means 140, and pressure control means 142.

The non-drive shift detecting means 130 is adapted to detect a non-drive shifting operation of the manually operated shift lever 72 from a drive position to a non-drive position, namely, from one of the LOW, SECOND, FORWARD-DRIVE and REAR-DRIVE positions "L", "2", "D", "R" to one of the PARKING and NEUTRAL positions "P", "N". In this embodiment, the non-drive shift detecting means 130 is adapted to detect the operation of the shift lever 72 from the REAR-DRIVE position "R" to the NEUTRAL position "N".

The pressure level memory means 132, which may be constituted by a part of the ROM 79, is provided to store data representative of a pressure level $P_D$ to which the pressure $P_{C2}$ of the clutch C2 is rapidly reduced by the pressure control means 142 (which will be described). The pressure level $P_D$ is preferably selected to be close to a critical level at which substantial releasing of the the clutch C2 is initiated. While this pressure level $P_D$ may be slightly higher or lower than this critical level, it is preferably determined to be slightly higher than the critical level.

The pressure level learning compensation means 134 is adapted to effect learning compensation of the pressure level $P_D$ indicated above, so that the releasing action of the clutch C2 takes place in the desired manner. In this embodiment, the pressure level learning compensation means 134 is adapted to update the pressure level $P_D$ so that a time duration $T_S$ between the moment of detection of the non-drive shifting operation of the shift lever 72 and the moment of initiation of the releasing action of the clutch C2 coincides with a target value $T_{ST}$. The pressure level $P_D$ thus updated is used in the next occurrence of the non-drive shifting operation of the shift lever 72.

The idling speed control means 136 is adapted to operate an idling speed control valve for controlling the speed $N_E$ of the engine 10 to be a target idling speed $N_{IDL}$ when the shift lever 72 is operated to the NEUTRAL position "N", as well known in the art. When an air conditioner or other optional device is operated by the engine 10 or when the temperature $T_W$ of the coolant water of the engine 10 is lower than a predetermined lower limit, the target idling speed $N_{IDL}$ is determined to be higher by a given amount than the normal target idling speed.

The threshold determining means 138 is adapted to determine a threshold time $T_D$ or threshold speed $N_D$ on the basis of the target idling speed $N_{IDL}$ of the engine 10 determined by the idling speed control means 136, and according to a predetermined relationship between the threshold value $T_D$, $N_D$ and the engine idling speed $N_{IDL}$. The determined threshold value $T_D$, $N_D$ is used by the clutch release detecting means 140 (which will be described) to determine whether the clutch C2 has been substantially fully released. The threshold value $T_D$ is a threshold of a time $T_{EL}$ which has passed after the moment of initiation of the releasing action of the clutch C2. The threshold value $N_D$ is a threshold of the speed $N_E$ of the engine 10.

The above-indicated predetermined relationship between the threshold value $T_D$, $N_D$ and the target engine idling speed $N_{IDL}$ used by the threshold time determining means 138 is stored in the ROM 79. For instance, the relationship between the threshold value $T_D$ and the target engine idling speed $N_{IDL}$ is formulated such that this value $T_D$ increases with the target engine idling speed $N_{IDL}$. For example, the threshold value $T_D$ is determined to be 0.3 sec. when the target engine idling speed $N_{IDL}$ is 700 r.p.m., and 0.5 sec. when the speed $N_{IDL}$ is 1000 r.p.m.

The clutch release detecting means 140 is adapted to detect substantially full releasing of the clutch C2, on the basis of the threshold value determined by the threshold determining means 138. For instance, the clutch release detecting means 140 is adapted to determine whether the time $T_{EL}$ which has passed after the moment of initiation of the releasing action of the clutch C2 has reached the threshold value $T_D$ which is determined by the threshold determining means 138 on the basis of the target engine idling speed $N_{IDL}$. In this case, the clutch release detecting means 140 detects the substantially full releasing of the clutch C2 when the time $T_{EL}$ has reached the threshold value $T_D$, namely, when the predetermined time $T_D$ has passed after the initiation of the releasing action of the clutch C2.

Figure 8:
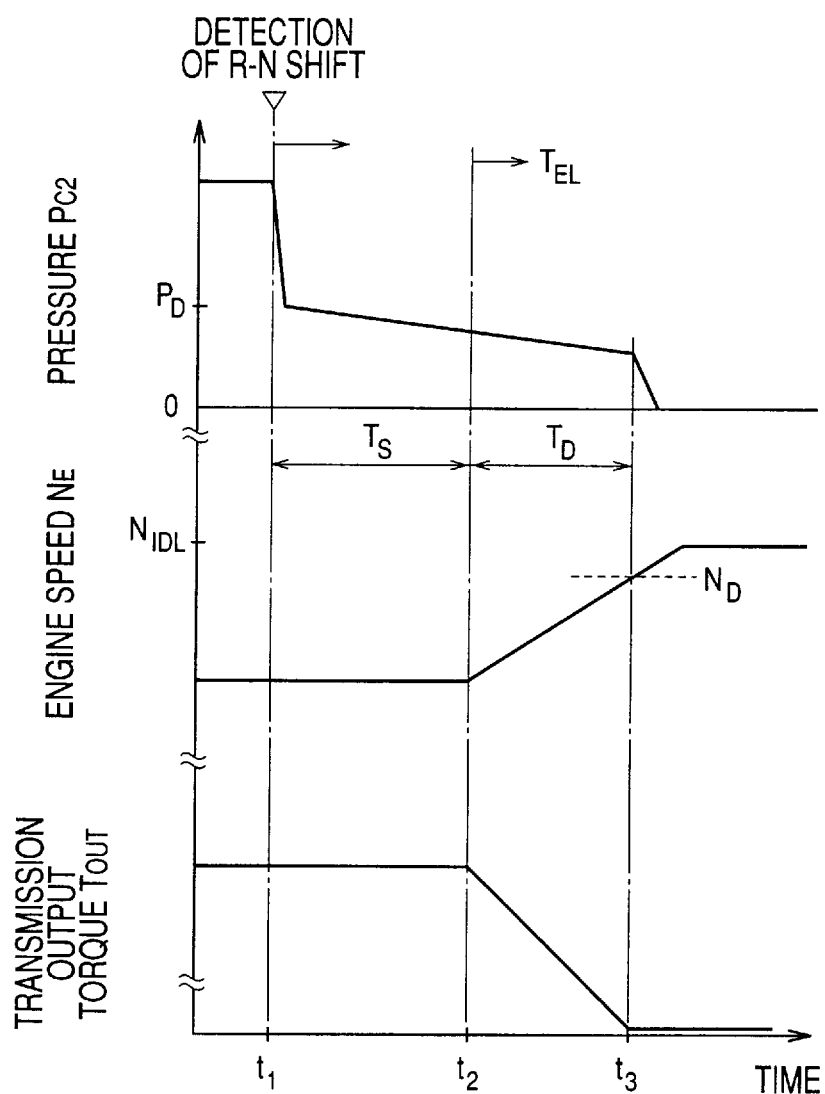
FIG. 8 is a time chart indicating changes of the pressure $P_{C2}$ of the clutch C2, engine speed $N_E$ and transmission output torque $T_{OUT}$ during control of the pressure $P_{C2}$ according to the routine of FIG. 6.

The pressure control means 142 is operated when the non-drive shifting operation of the shift lever 72 from the REAR-DRIVE position "R" to the NEUTRAL position "N". This pressure control means 142 is adapted to reduce the pressure $P_{C2}$ of the clutch C2 as shown in FIG. 8 by way of example only, to release the clutch C2 for shifting the automatic transmission 14 to the non-drive position for disconnecting the power transmitting path, without a shifting shock of the automatic transmission 14. To this end, the pressure control means 142 incorporates rapid pressure reduction means 144, continuous pressure reduction means 146 and fully releasing means 142. The rapid pressure reduction means 144 is arranged to rapidly reduce the pressure $P_{C2}$ to the predetermined level $P_D$ (updated by the learning compensation means 134) which is slightly higher than the critical level at which the clutch C2 starts slipping. The continuous pressure reduction means 146 is adapted to continuously reduce the pressure $P_{C2}$ from the pressure level $P_D$ at a predetermined rate $\Delta P_S$ which is considerably lower than the rate at which the rapid reduction is effected by the rapid pressure reduction means 144. The fully releasing means 148 is adapted to reduce the pressure $P_{C2}$ to the atmospheric pressure when the substantially full releasing of the clutch C2 is detected by the clutch release detecting means 140.

Figure 6:
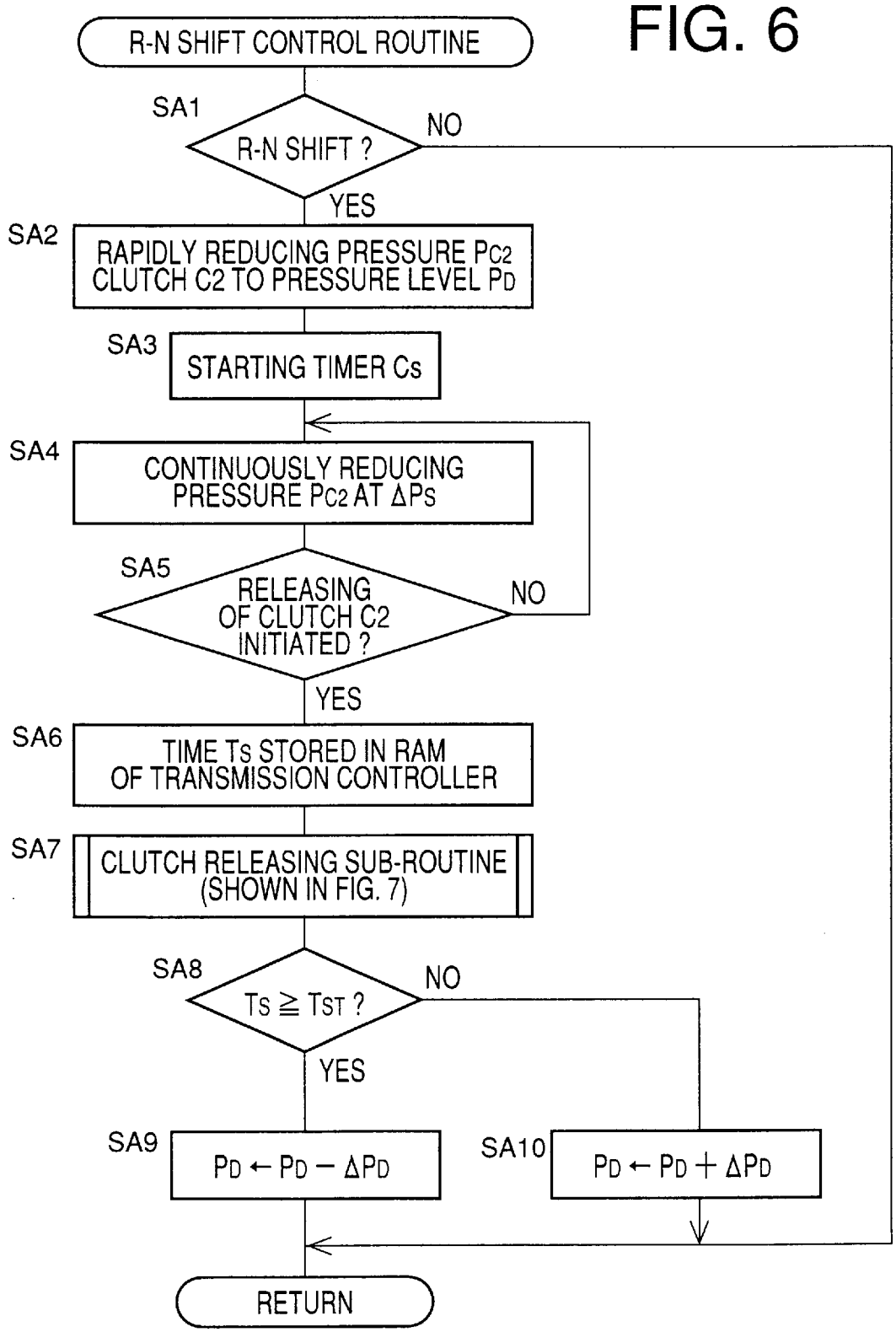
FIG. 6 is a flow chart illustrating a routine executed by the transmission controller, for controlling pressure $P_{C2}$ of clutch C2, upon R–N shifting operation of a shift lever from REAR-DRIVE position to NEUTRAL position.

The transmission controller 78 is adapted to execute a rear-to-neutral shift (R–N) control routine illustrated in the flow chart of FIG. 6, for controlling the pressure $P_{C2}$ to shift the automatic transmission 14 to the non-drive position in response to the non-drive shifting operation of the shift lever 72 from the REAR-DRIVE position "R" to the NEUTRAL position "N".

The R–N shift control routine of FIG. 6 is initiated with step SA1 corresponding to the non-drive shift detecting means 130, to determine whether the shift lever 72 has been operated from the REAR-DRIVE position "R" to the NEUTRAL position "N". This determination is effected on the basis of the output signal of the shift position sensor 74, which indicates the currently established position Psh of the shift lever 72. If a negative decision (NO) is obtained in step SA1, one cycle of execution of the routine of FIG. 6 is terminated.

If an affirmative decision (YES) is obtained in step SA1, the control flow goes to step SA3 corresponding to the rapid pressure reduction means 144, in which the pressure $P_{C2}$ of the clutch C2 is rapidly reduced from the maximum value to the predetermined level $P_D$ which is stored in the ROM 79 (pressure level memory means 132) and which is updated by the pressure level learning compensation means 134. This rapid reduction of the pressure $P_{C2}$ is indicated at point "t1" in the time chart of FIG. 8.

Step SA2 is followed by step SA3 to start a timer Cs for measuring a time which has passed after the detection of the non-drive shifting operation of the shift lever 72 from the REAR-DRIVE position "R" to the NEUTRAL position "N". Then, the control flow goes to step SA4 corresponding to the continuous pressure reduction means 146, to continuously reduce the pressure $P_{C2}$ from the pressure level $P_D$ at the predetermined reduction rate $\Delta P_S$, This rate $\Delta P_S$ is determined so as to minimize a shifting shock even if the substantial releasing of the clutch C2 is initiated during a period of the continuous pressure reduction.

Step SA4 is followed by step SA5 to determine whether the slipping or releasing action of the clutch C2 has been initiated. This determination is effected by determining whether a rise of the engine speed $N_E$ has been initiated. If a negative decision (NO) is obtained in step SA5, the control flow goes back to step SA4, so that the continuous reduction of the pressure $P_{C2}$ is continued until an affirmative decision (YES) is obtained in step SA5.

If the affirmative decision (YES) is obtained in step SA5, the control flow goes to step SA6 in which the content of the timer Cs (indicative of the time after the detection of the non-drive shifting operation of the shift lever 72) is stored in a random-access memory of the transmission controller 78, as a time $T_S$ between the moment of detection of the non-drive shifting operation of the shift lever 72 and the moment of initiation of the releasing action of the clutch C2. In the example of FIG. 8, the affirmative decision (YES) is obtained in step SA5, at point of time "t2".

Figure 7:
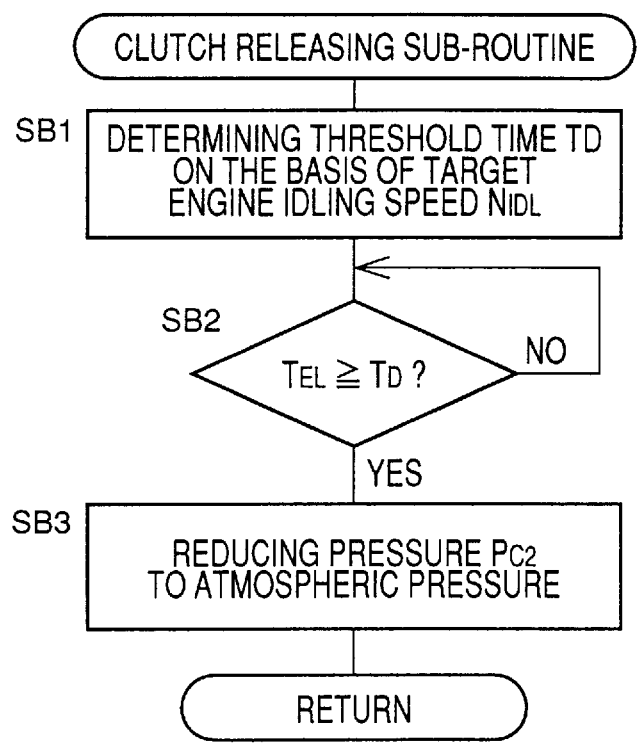
FIG. 7 is a flow chart illustrating a sub-routine implemented in step SA7 of the routine of FIG. 6.

Then, the control flow goes to step SA7 in which a clutch releasing sub-routine illustrated in the flow chart of FIG. 7 is executed to reduce the pressure $P_{C2}$ to the atmospheric pressure when the substantially full releasing of the clutch C2 is detected. The sub-routine of FIG. 7 is initiated with step SB1 corresponding to the threshold determining means 138, wherein the threshold value $T_D$ of the time $T_{EL}$ which has passed after the moment of initiation of the releasing action of the clutch C2 is determined on the basis of the target engine idling speed $N_{IDL}$ determined by the idling speed control means 136. This threshold time $T_D$ is used in the following step SB2. That is, step SB2 is provided to determine whether the time $T_{EL}$ after the moment of initiation of the releasing action of the clutch C2 is equal to or longer than the threshold value $T_D$, that is, whether the predetermined time $T_D$ has passed after the releasing action is initiated. This step SB2 is repeatedly implemented until an affirmative decision (YES) is obtained therein.

When the affirmative decision (YES) is obtained in step SB2, the control flow goes to step SB3 corresponding to the fully releasing means 148, to reduce the pressure $P_{C2}$ down to the atmospheric pressure, as indicated at "t3" in FIG. 8.

Referring back to the flow chart of FIG. 6, step SA7 (sub-routine of FIG. 7) is followed by step SA8 to determine whether the time duration $T_S$ between the moment of detection of the non-drive shifting operation of the shift lever 72 to the NEUTRAL position "N" and the moment of initiation of the clutch C2 is equal to or longer than the target value $T_{ST}$. If an affirmative decision (YES) is obtained in step SA8, the control flow goes to step SA9 in which the presently effective pressure level $P_D$ (to which the pressure $P_{C2}$ is rapidly reduced) is decremented by a predetermined decrement $\Delta P_D$, whereby the pressure level $P_D$ is updated by learning compensation. If a negative decision (NO) is obtained in step SA8, the control flow goes to step SA10 in which the presently effective pressure level $P_D$ is incremented by a predetermined increment $\Delta P_D$, whereby the pressure level $P_D$ is updated by learning compensation. The pressure level $P_D$ updated in step SA9, SA10 is used in step SA2 in the next control cycle, namely, upon the next occurrence of the non-drive shifting operation of the shift lever 72. It will be understood that steps SA8–SA10 correspond to the pressure level learning compensation means 134.

Figure 9:
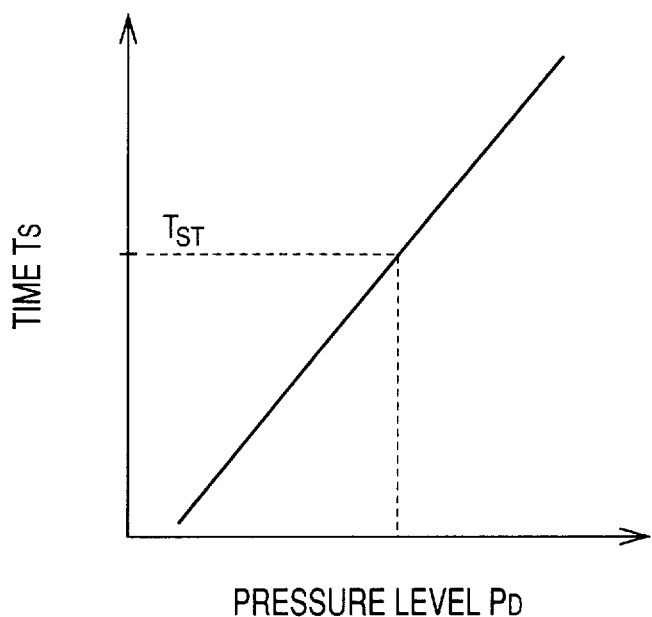
FIG. 9 is a graph indicating a relationship between time $T_S$ from the R–N shifting operation to initiation of releasing of the clutch C2, and pressure level $P_D$ to which the pressure $P_{C2}$ is rapidly reduced and which is updated by learning compensation.

The time duration $T_S$ and the pressure level $P_D$ has a predetermined relationship as indicated in the graph of FIG. 9 by way of example. With the pressure level $P_D$ updated by learning compensation by the learning compensation means 134, the time duration $T_S$ between the moment of detection of the non-drive shifting operation and the moment of initiation of the releasing action of the clutch C2 is controlled so as to coincide with the target value $T_{ST}$. In other words, the pressure level $P_D$ is updated so that or such that the time duration $T_S$ coincides with the desired or target value $T_{ST}$.

In the transmission control apparatus according to the present embodiment of thus invention, the rapid pressure reduction means 144 (step SA2) is operated, upon detection of the non-drive shifting operation operation of the manually operated shift lever 72 from the drive position "R" to the non-drive position "N", to rapidly reduce the pressure $P_{C2}$ of the hydraulically operated friction clutch C2 from the predetermined level $P_D$, and then the continuous pressure reduction means 146 (step SA4) is operated to continuously reduce the pressure $P_{C2}$ from the predetermined pressure level $P_D$ at the predetermined reduction rate $\Delta P_S$, whereby the clutch C2 is eventually released. Since the present apparatus permits the clutch C2 to be released with relatively slow reduction of its pressure $P_{C2}$, an elastic energy which has been accumulated by torsional deformation of the various components of the vehicle drive system is relatively slowly consumed as the clutch C2 is slowly released. Accordingly, the present control apparatus permits the automatic transmission 14 to be shifted to the non-drive position with a reduced shifting shock, in response to the non-drive shifting operation of the shift lever 72 from the REAR-DRIVE position "R" to the NEUTRAL position "N".

Further, the pressure level learning compensation means 134 (steps SA8–SA10) is provided to update the pressure $P_D$ such that the releasing action of the clutch C2 takes place in the predetermined or desired manner, more specifically, such that the time duration $T_S$ between the moment of detection of the non-drive shifting operation of the shift lever 72 from the REAR-DRIVE position "R" to the NEUTRAL position "N" and the moment of initiation of the releasing action of the clutch C2 coincides with the target or desired value. This learning compensation of the pressure level $P_D$ permits the automatic transmission 14 to be shifted to the non-drive position without a considerable shifting shock in response to the non-drive shifting operation of the shift lever 72, irrespective of a change in the temperature $T_{OIL}$ of the working fluid and a chronological change of the releasing characteristic of the clutch C2.

In addition, the present control apparatus includes the fully releasing means 148 (step SB3) for reducing the pressure $P_{C2}$ to the atmospheric pressure when the clutch release detecting means 140 (step SB2) detects substantially releasing of the clutch C2. This reduction of the pressure $P_{C2}$ to the atmospheric pressure after the detection of the substantially full releasing of the clutch C2 is effective to avoid abrupt consumption of the residual elastic energy of the vehicle drive system due to earlier exposure of the clutch C2 to the atmospheric pressure.

It is also noted that the threshold time $T_D$ used by the clutch release detecting means 140 is determined by the threshold determining means 138 (step SB1) on the basis of the target engine idling speed $N_{IDL}$, so that the accuracy of detection of the substantially full releasing of the clutch C2 by the clutch release detecting means 140 is accordingly improved.

Referring next to the flow chart of FIG. 10, there will be described a clutch releasing sub-routine which is implemented in step SA7 in a second embodiment of this invention, in place of the sub-routine of FIG. 7.

The sub-routine of FIG. 10 is initiated with step SC1 corresponding to the threshold determining means 138, wherein the threshold value $N_D$ of the engine speed $N_E$ is determined on the basis of the target engine idling speed $N_{IDL}$ determined by the idling speed control means 136. This threshold engine speed $N_D$ is used in the following step SC2. That is, step SC2 is provided to determine whether the engine speed $N_E$ is equal to or higher than the threshold value $N_D$. This step SC2 is repeatedly implemented until an affirmative decision (YES) is obtained therein.

When the affirmative decision (YES) is obtained in step SC2, the control flow goes to step SC3 corresponding to the fully releasing means 148, to reduce the pressure $P_{C2}$ down to the atmospheric pressure, as indicated at "t3" in FIG. 8.

In this second embodiment, too, the accuracy of detection of the substantially full releasing of the clutch C2 by the clutch release detecting means 140 is significantly improved.

While the several presently preferred embodiments of this invention have been described in detail by reference to the accompanying drawings, the invention may be otherwise embodied.

In the illustrated embodiments, the control apparatus is adapted to control the pressure $P_{C2}$ of the clutch C2 according to the principle of the present invention, when the shift lever 72 is shifted from the REAR-DRIVE position "R" to the NEUTRAL position "N". However, the principle of the present invention is equally applicable to a control apparatus adapted to control the pressure $P_{C1}$ of the clutch C1 when the shift lever 72 is shifted from the FORWARD-DRIVE position "D" to the NEUTRAL position "N".

While the pressure level learning compensation means 134 in the illustrated embodiments is adapted to update the pressure level $P_D$ such that the time duration $T_S$ from the moment of operation of the shift lever 72 to the NEUTRAL position "N" to the moment of initiation of the releasing action of the clutch C2 coincides with the target value $T_{ST}$. However, the learning compensation means 134 may be modified to update the pressure level $P_D$ such that the rate of rise of the engine speed $N_E$ after the initiation of the releasing action of the clutch C2 coincides with a predetermined target value.

In the first embodiment of FIGS. 6 and 7, the time $T_{EL}$ after the initiation of the releasing action of the clutch C2 is used in step SB2 to detect the substantially full releasing of the clutch C2. However, the time $T_{EL}$ may be replaced by a time after the moment of detection of the non-drive shifting operation of the shift lever 72 to the NEUTRAL position "N". In this case, the threshold value used in step SB2 corresponds to a sum of the time duration $T_S$ and the threshold value $T_D$, as indicated in FIG. 8.

The threshold values $T_D$, $N_D$ which are used to detect the substantially full releasing of the clutch C2 may be determined to detect a point of time which precedes the expected moment of substantially full releasing of the clutch C2, by an amount corresponding to a delay time from the moment at which the reduction of the pressure $P_{C2}$ to the atmospheric pressure is commanded to the moment at which the pressure $P_{C2}$ has been actually reduced to the atmospheric pressure.

It is to be understood that the present invention may be embodied with various other changes, modifications and improvements, which may occur to those skilled in the art, without departing from the spirit and scope of the invention defined in the following claims:

What is claimed is:

1. An apparatus for controlling an automatic transmission of a motor vehicle which is shifted to a non-drive position with a releasing action of a hydraulically operated frictional coupling clutch upon operation of a manually operated member from a drive position to a non-drive position, said apparatus comprising:

non-drive shift detecting means for detecting a non-drive shifting operation of said manually operated member from said drive position to said non-drive position;

rapid pressure reduction means, operated upon detection of said non-drive shifting operation by said non-drive shift detecting means, for rapidly reducing a pressure of said hydraulically operated frictional coupling device to a predetermined pressure level; and continuous pressure reduction means for continuously reducing the pressure of said frictional coupling device from said predetermined pressure level at a predetermined reduction rate.

2. An apparatus according to claim 1, further comprising pressure level learning compensation means for updating, by learning compensation, said predetermined pressure level such that said releasing action of said frictional coupling device takes place in a predetermined manner.

3. An apparatus according to claim 2, wherein said pressure level compensation means updates said predetermined pressure level such that a time duration between a moment of detection of said non-drive shifting operation of said manually operated member by said non-drive shift detecting means and a moment of initiation of said releasing action of said frictional coupling device coincides with a predetermined target time.

4. An apparatus according to claim 1, further comprising:

clutch release detecting means for detecting substantial full releasing of said frictional coupling device; and fully releasing means, operated upon detection of said substantially full releasing of said frictional coupling device by said clutch release detecting means, for reducing the pressure of said frictional coupling device to an atmospheric pressure.

5. An apparatus according to claim 4, wherein said automatic transmission is operatively connected to an engine, said apparatus further comprising:

idling speed control means for controlling a speed of said engine, in response to said non-drive shifting operation of said manually operated member, such that the speed of the engine coincides with a predetermined target value; and threshold determining means for determining, on the basis of said predetermined target value of the speed of the engine, a threshold which is used by said clutch release detecting means to determine whether said frictional coupling device has been substantially fully released.

6. An apparatus according to claim 5, wherein said threshold determining means determines, as said threshold, a threshold value of a time which has passed after a moment of initiation of said releasing action of said frictional coupling device, said threshold determining means determining said threshold value on the basis of said predetermined target value of the speed of said engine, said clutch release detecting means detecting said substantially full releasing of said frictional coupling device when said time has reached said threshold value.

7. An apparatus according to claim 5, wherein said threshold determining means determines, as said threshold, a threshold value of the speed of said engine on the basis of said predetermined target value of the speed of the engine, said clutch release detecting means detecting said substantially full releasing of said frictional coupling device when the speed of said engine has increased to said threshold value.

* * * * *